[45.]

Q. M. YOUNG.
Improvement in Blind Slat Operators.

No. 118,573. Patented Aug. 29, 1871.

Witnesses:
Chas. Nida.
Gustave Dieterich

Inventor:
Q. M. Young.
Per
Attorneys.

118,573

UNITED STATES PATENT OFFICE.

QUINTEN M. YOUNG'S, OF UTICA, NEW YORK.

IMPROVEMENT IN BLIND-SLAT OPERATORS.

Specification forming part of Letters Patent No. 118,573, dated August 29, 1871.

*To all whom it may concern:*

Be it known that I, QUINTEN M. YOUNG'S, of Utica, in the county of Oneida and State of New York, have invented a new and Improved Blind-Slat Operator; and I do hereby declare that the following is a full, clear, and exact description thereof, which will enable others skilled in the art to make and use the same, reference being had to the accompanying drawing forming part of this specification.

This invention relates to improvements in apparatus for operating the slats of window-blinds for opening and closing them, also for fastening them; and it consists in a rod mounted in a sleeve having arms pivoted to the lower cross-piece of the blind, connected by an arm to the bar, to which the slats are commonly connected, and connected also with a slotted slide arranged in one of the sides of the window-frame for actuating the slats by raising or lowering the said bar from the inside without raising the window, said slide being actuated by a bell-crank having a handle projecting from the front of the window-frame, and having a rack-bar and spring-catch for holding it in any position, all as hereinafter described.

Figure 1:
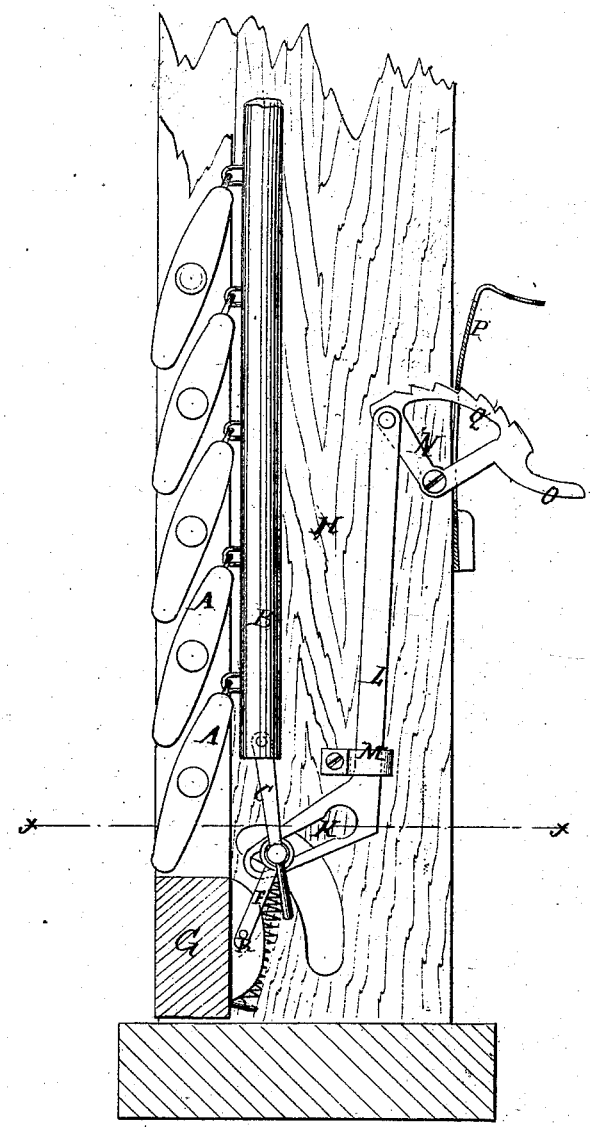
Figure 2:
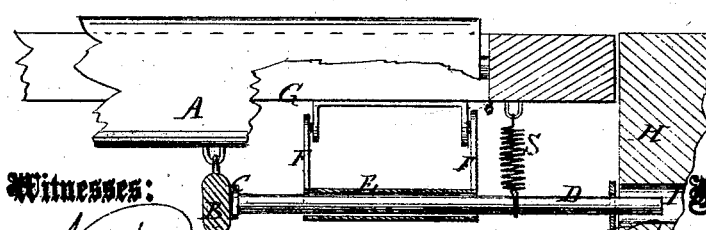

Figure 1 is a sectional elevation of a window-blind and frame, showing my improved apparatus. Fig. 2 is a horizontal section of Fig. 1 taken on the line $x\,x$.

Similar letters of reference indicate corresponding parts.

A represents the slats of the blind, and B the bar to which they are commonly connected. This bar is connected at the lower end by an arm, C, with a horizontal rod or shaft, D, which is mounted in a tube or sleeve, E, connected to the lower cross-piece G by arms F pivoted thereto, so that it may swing up and down as much as the bar B does in opening or closing the slats. This rod D, extending to the side H of the window-frame and into a curved slot, I, therein, passes through the slot K of a bar, L, fixed on the side of a window-frame to slide up and down in a guide, M, and having a bell-crank, N, pivoted to said side, so that its handle, O, projects from the front of the window-frame conveniently for the application of the hand for actuating it. Said bell-crank works through a slotted catch-spring, P, and has a curved rack-bar, Q, the teeth of which will be caught by the catch when it bears against the front of the window-sash, but will be released when said catch is pushed forward from the frame, owing to the radius of the spring being greater and not in the same axis of that of the bell-crank. The slot of bar L is oblique to the line of the movement of the bar, and will cause the rod D to swing on the pivots R when moved up or down. S is a spring attached to bar D to assist in moving it downward in case the bar should fail to move it down. It also serves to hold the rack-bar Q snugly against the spring-catch, and it keeps the slats open when not held by the catch. This spring may be used or not, as preferred.

Having thus described my invention, I claim as new and desire to secure by Letters Patent—

1. The combination of the rod D, sliding slotted bar L, ratcheted bell-crank N, and catch-spring P, all substantially as specified.

2. The combination, with the above, of the spring S, substantially as specified.

Witnesses:     QUINTEN M. YOUNG'S.
    A. O. MATHEWS,
    JAMES MICKEL.